United States Patent [19]

Costanzi et al.

[11] 4,321,190
[45] Mar. 23, 1982

[54] POLYOLEFIN COMPOSITIONS STABILIZED AGAINST UV LIGHT RADIATIONS WITH OPEN-CHAIN HINDERED AMINES

[75] Inventors: Silvestro Costanzi, S. Giuliano Milanese; Francesco Tessarolo, Monza; Adriano Ballabio, Giussano; Tito Salvatori, San Donato Milanese, all of Italy

[73] Assignee: Anic S.p.A., Palermo, Italy

[21] Appl. No.: 213,656

[22] Filed: Dec. 5, 1980

[30] Foreign Application Priority Data

Feb. 19, 1980 [IT] Italy .............................. 20000 A/80

[51] Int. Cl.³ .............................................. C08K 5/17
[52] U.S. Cl. .................................................... 524/252
[58] Field of Search .............. 260/45.9 AD, DIG. 19, 260/32.6 PQ, 45.9 R; 526/83

[56] References Cited

U.S. PATENT DOCUMENTS

| | | | |
|---|---|---|---|
| 2,514,185 | 7/1950 | Eberly | 260/45.9 AD |
| 2,994,675 | 8/1961 | Howard et al. | 260/23 H |
| 3,181,971 | 5/1965 | Rayner | 260/45.9 AD |
| 3,198,763 | 8/1965 | Peterli | 260/45.9 AD |
| 3,223,695 | 12/1965 | Gallaugher | 260/45.9 AD |
| 3,773,743 | 11/1973 | Ainsworth et al. | 260/45.9 AD |

*Primary Examiner*—V. P. Hoke
*Attorney, Agent, or Firm*—Morgan, Finnegan, Pine, Foley & Lee

[57] ABSTRACT

This invention relates to particular polyolefin compositions which contain, as stabilizers against UV-light radiations, open-chain amine compounds which are hindered in the alpha-position by alkyl radicals, said amine compounds corresponding to the following general formula:

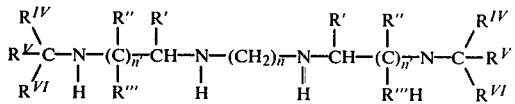

wherein R', R'', R''', $R^{IV}$, $R^V$ and $R^{VI}$ which can be equal or different, are radicals of aliphatic hydrocarbons with a number of C-atoms variable from 1 to 20, or can be hydrogen atoms, n is an integer variable from 2 to 12, and n' is an integer comprised between 1 and 15.

4 Claims, No Drawings

POLYOLEFIN COMPOSITIONS STABILIZED AGAINST UV LIGHT RADIATIONS WITH OPEN-CHAIN HINDERED AMINES

This invention relates to novel polyolefin compositions which are stabilized against UV light radiations by incorporating therein hindered amines with an open-chain structure.

It is known that polyolefines, especially polypropylene and polyethylene, are subjected to degradation with the lapse of time due to weathering, especially on account of the action of UV light rays.

This degradation is manifested by decay of the physical properties of the articles, such, as for example, decrease of the tensile strength of flexibility.

This decay of the properties of the polymers is manifested by a strong increase of the viscosity index of the melted polymer, i.e. the Melt Flow Index (M.F.I.).

The measure of the MFI increase is used for assessing the degradation of the polymers due to degradation agents, such as weathering agents and UV light radiations.

To prevent deterioration of the polyolefines and thus worsening of their physical properties, resort has been to incorporating therein small amounts of stabilizing substances, of such a nature as not adversely to influence the other intrinsic properties of the polymers concerned.

It has now been found, and this is an object of the present invention, that open-chain amine compounds which are hindered in their alpha-position by alkyl radicals possess quite excellent stabilizing properties against the action of UV light rays for polyolefines such as polyethylene and polypropylene. The synthesis of said amine compounds will be described hereinafter for a few of them.

Amine compounds which can be used are those corresponding to the following general formula:

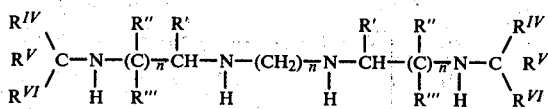

wherein R', R'', R''', $R^{IV}$, $R^V$ and $R^{VI}$, which can be equal or different, are radicals of aliphatic hydrocarbons with a number of C-atoms variable from 1 to 20, or can be hydrogen atoms, n is an integer variable from 2 to 12, and n' is an integer comprised between 1 and 15.

More particularly, and reference will be had hereinafter to this formula, useful products are polybasic amines having the formula:

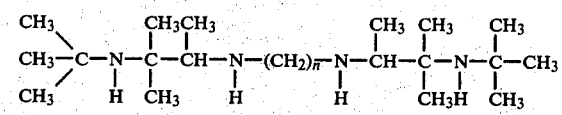

wherein n is an integer comprised between 2 and 12.

The products in question are obtained by condensation or reduction of a diamine having the general formula $NH_2-(CH_2)_n-NH_2$ with 3-(N-tert.butylamino)-3-methyl-2-butane-one.

Amines thus obtained can be added, as additives, to the polymers which have already been compounded with the usual processing ingredients according to the usual procedures of compound blending.

In the Examples which are reported hereinafter and are given better to illustrate the invention, the synthesis of the stabilizing products is described and results of tests of anti-UV light stabilization of polypropylene are given, also in comparison with known commercial products.

EXAMPLE 1

Preparation of 3-(N-tert.butylamino)-3-methyl-1-butyne

A 3-necked 1-liter flask equipped with stirrer, thermometer and dropping funnel is charged with 210 mls of tert.butylamine, 150 mls of dimethylformamide and 2 g of copper powder.

To this solution there are added slowly, through the dropping funnel, 102 g of 3-chloro-3-methyl-butyne, freshly distilled.

The temperature of the mixture is maintained at 35° C. for a total time of 4 hours.

On completion of the reaction, the solids are separated from the liquid by filtration, the filtrate is poured in water and extracted three times with ethyl ether.

The ethereal extracts are combined, dried over NaOH and distilled.

The expected product is obtained with a molar yield of 70% relative to the added chloromethylbutyne.

The product is a white crystalline solid having a melting point of 24° C.-25° C.

EXAMPLE 2

Preparation of 3-(N-tert.butylamino)-3-methyl-2-butane-one

This preparation has been carried out by hydration of the triple bond of 3-tert.butylamino-3-methyl-butyne, performed according to the indications by Rose in Journal of Chemical Society, pages 782, 1949.

A 3-necked flask having a stirrer, a thermometer and a reflux condenser is charged with 300 mls of 96% sulfuric acid (density 1.8), 100 mls water, 4 g red HgO and 150 g of the acetylene amine mentioned above. The reaction is carried for 3 hours at 100° C. The mixture is then supplemented with activated carbon poured on ice and filtered.

The filtrate is then made alkaline with 40% aq. NaOH and then extracted with ether.

The expected product is obtained in the pure state by distillation and is a colourless liquid the boiling point of which is 58° C.-59° C. under an abs. pressure of 50 mmHg and the structure of which has been confirmed by the NMR analysis.

EXAMPLE 3

Preparation of hexamethylenediamine-N,N'-bis-1,2-dimethyl-2(N-tert-.butylamino)-propane A flask equipped with liquid extractor is charged with 20 g of 3-(N-tert.butylamino)-3-methyl-2-butane-one, 60 g of hexamethylenediamine, 2.5 g of $ZnCl_2$ and 100 mls xylene. The mixture is refluxed for 24 hours with removal of water, and is eventually poured in water. The layers are separated and distillation is carried out. The colourless liquid product thus obtained, which exhibits, at the Infra-Red spectroscopical analysis the characteristics bands of the C=N bond, is transferred into an autoclave together with glacial acetic acid and Palladium on activated carbon.

The mixture is heated to 50° C.-60° C. and is maintained under a pressure of hydrogen.

On completion of the reaction the mixture is filtered, made alkaline with aq. NaOH and extracted with ether.

The combined ethereal extracts are dried and distilled. The structure has been confirmed by the Infra-Red analysis and by Mass spectroscopy.

The homologs deriving from octamethylenediamine and dodecamethylenediamine have been prepared in a like manner.

To ascertain the stabilizing action of the amines thus obtained, these have been incorporated in polypropylene and UV light radiation exposure tests have been performed on the compounds in which such additives had been introduced.

EXAMPLE 4

Anti-UV light stabilization of polypropylene

General Purpose polypropylene, which had already been compounded with the usual stabilizers and processing ingredients, has been supplemented with the 0.5%, 0.55% and 0.6%, respectively, of the three amines prepared as set forth in the foregoing, viz.:
1. Hexamethylenediamine-N,N'-bis-(1,2-dimethyl, 2-tert.butylamino)-propane
2. Octamethylenediamine-N,N'-bis-(1,2-dimethyl-2-tert.butylamino)-propane, and
3. Dodecamethylenediamine-N,N'-bis-(1,2-dimethyl-2-tert.butylamino)-propane.

Blending has been effected according to the usual procedure for incorporating the stabilizers in polyolefins (roll mill, 180° C. for 5 minutes).

From the mixtures, plates have been prepared, having a thickness of 0.5 mm in a compression press at 180° C. according to the following sequence: 5 min preheating, 5 min pressing.

The plates thus prepared have been exposed in an Atlas Weatherometer having two arc lamps with maximum emissions at 3,600, 3,850 and 4,20 Ångstrom Units, with rain cycle (102 mins. irradiation and 18 mins, rain).

Samples of the same polypropylene have been stabilized with commercially available anti-UV light stabilizers in the usual amounts, viz.:

A benzotriazole derivative (Tinuvin P) 0.5% and a benzophenone derivative (Tinuvin 531) 0.5% and from the two resulting compounds there have been prepared the corresponding plates to be exposed in the Weatherometer under the same conditions as for the plates obtained from compounds containing the products according to the present invention.

Then, there have been determined the resistance to the exposure to UV light radiations of the propylene containing the several additives and that of the polypropylene as such, by measurements of viscosity (Melt Flow Index=MFI) according to what has been prescribed in ASTM D 1238, after the different exposure times.

The results of the stabilization tests are tabulated in the following TABLE which reports the values of the MFI of the propylene samples as such and stabilized with the different stabilizers, up to a test duration of 1,800 hours.

TABLE

TREND OF THE MFI OF GENERAL PURPOSE POLYPROPYLENE STABILIZED AGAINST UV-LIGHT RADIATIONS.

| Exposure Time, hours | Melt Flow Index (MFI) | | | | | |
|---|---|---|---|---|---|---|
| | Start | 500 | 750 | 1000 | 1250 | 1800 |
| Polypropylene, as such | 3.8 | 4.8 | 5.7 | 7 | 9 | 50 |
| Polypropylene + 0.5% product No. 1 | 5.7 | 5 | 5 | 5 | 7 | 8.2 |
| Polypropylene + 0.55% product No. 2 | 5 | 5.5 | 5.5 | 6 | 7 | 8.5 |
| Polypropylene + 0.6% product No. 3 | 5.5 | 5.5 | 5.7 | 7 | 7 | 8.5 |
| Polypropylene + 0.5% benzotriazole der. (Tinuvin P) | 3.6 | 5.1 | 5.2 | 6 | 6.5 | 22 |
| Polypropylene + 0.5% benzophenone der. (Tinuvin 531) | 4.5 | 5.2 | 5.6 | 8 | 7 | 50 |

It is apparent from a consideration of the tabulated data that the compositions of the present invention are stable to UV light radiations not only to a degree which is comparable with those stabilized with the commercial products, but even much more stable than the commercial products for long exposure times.

We claim:
1. Polyolefin compositions stabilized against ultraviolet light radiations which contain amine compounds defined by the following general formula:

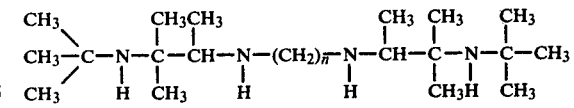

wherein n is an integer comprised between 2 and 12.
2. Polyolefin compositions according to claim 1 wherein, in the formula, n is 6.
3. Polyolefin compositions according to claim 1 wherein, in the formula, n is 8.
4. Polyolefin compositions according to claim 1 wherein, in the formula n is 12.

* * * * *